United States Patent [19]

Furukawa et al.

[11] Patent Number: 4,904,552
[45] Date of Patent: Feb. 27, 1990

[54] NON-AQUEOUS SECONDARY CELL

[75] Inventors: Nobuhiro Furukawa, Hirakata; Toshihiko Saito; Toshiyuki Nohma, both of Kyoto, all of Japan

[73] Assignee: Sanyo Electric Co., Ltd., Moriguchi, Japan

[21] Appl. No.: 383,249

[22] Filed: Jul. 19, 1989

Related U.S. Application Data

[63] Continuation of Ser. No. 149,451, Jan. 28, 1988, abandoned.

[30] Foreign Application Priority Data

Jan. 29, 1987 [JP] Japan .................................. 62-19330

[51] Int. Cl.$^4$ ............................................. H01M 10/40
[52] U.S. Cl. ...................................... 429/197; 429/224
[58] Field of Search ....................... 429/224, 194, 197

[56] References Cited

U.S. PATENT DOCUMENTS

| | | | |
|---|---|---|---|
| 4,312,930 | 1/1982 | Hunter | 429/194 |
| 4,615,959 | 10/1986 | Hayashi et al. | 429/194 |
| 4,828,834 | 8/1989 | Nagaura et al. | 429/224 |

Primary Examiner—Donald L. Walton
Attorney, Agent, or Firm—Armstrong, Nikaido, Marmelstein, Kubovcik & Murray

[57] ABSTRACT

A non-aqueous secondary cell is provided which is repeatedly chargeable and dischargeable. This cell comprises, as main components thereof, a negative electrode, a positive electrode, and a separator disposed between the positive electrode and negative electrode and impregnated with an electrolyte. The negative electrode has lithium or a lithium alloy as the active material. The positive electrode has as the active material a manganese oxide expressed by a chemical formula $Li_{1-x}Mn_2O_4$ wherein $1 \geq X \geq 0$.

11 Claims, 7 Drawing Sheets

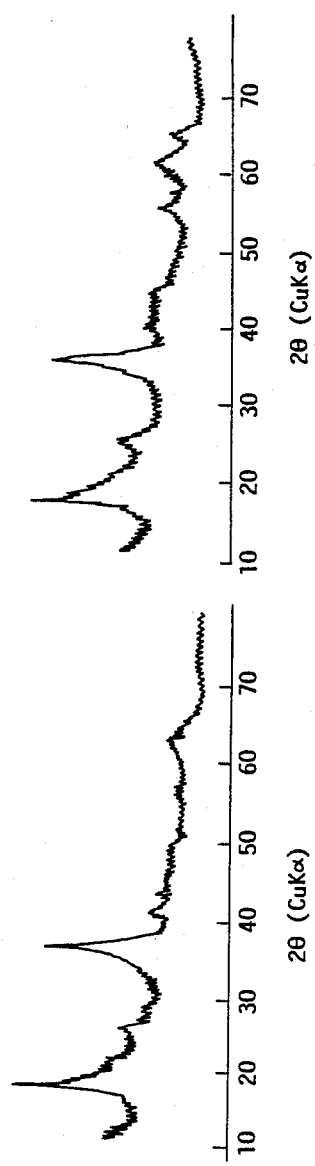
Fig. 1d
Fig. 1e
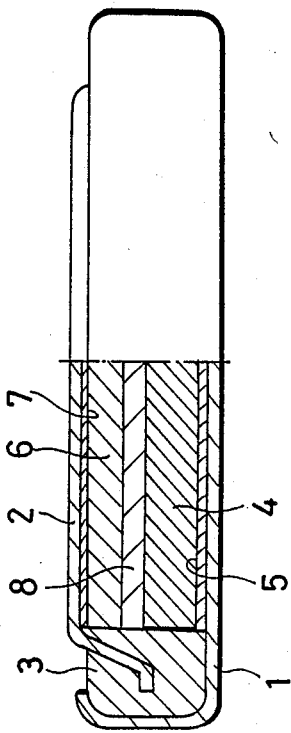
Fig. 2

2θ (CuKα)

2θ (CuKα)

NON-AQUEOUS SECONDARY CELL

This application is a continuation of application Ser. No. 149,451, filed Jan. 28, 1988 now abandoned.

BACKGROUND OF THE INVENTION

(1) Field of the Invention

The present invention relates to a non-aqueous secondary cell in which lithium or lithium alloy is used as the active material for the negative electrode, and particularly to an improvement in the positive electrode.

(2) Description of the Prior Art

Molybdenum trioxide, vanadium pentoxide, titanium and niobic sulfide have been proposed as the active material for the positive electrode of this type of secondary cell, but these substances have not been to practical use to date.

For the positive electrode of the non-aqueous primary cell, on the other hand, manganese dioxide and carbon fluoride are known to be typical examples of active material and are actually employed for the purpose. Manganese dioxide in particular has the advantages of being excellent in storage characteristics, abundant in the earth and inexpensive.

As the crystal structure of manganese dioxide suited for the positive electrode, $\gamma$-$\beta$MnO$_2$ heat-treated at temperatures of 250°–350° C. has been proposed as in Japanese Patent Publication No. 49-25571. This $\gamma$-$\beta$MnO$_2$, however, is unsatisfactory in reversibility and has the problem of lowering charge and discharge characteristics. The reason will be explained with reference to FIGS. 1a–1e of the accompanying drawings showing X-ray diffraction patterns.

FIG. 1a shows a diffraction pattern prior to charging and discharging. FIGS. 1b and 1c show diffraction patterns at a 10th discharge and charge, respectively. Compared with the pattern of FIG. 1a, it will be seen that the patterns of FIGS. 1b and 1c show the angles of diffraction shifting to a lower side and the peaks becoming less sharp also after charging. These trends are more conspicuous and the peaks are almost leveled out in the patterns at a 100th discharge and charge shown in FIGS. 1d and 1e, respectively. It may be deduced from the above that a repetition of charges and discharges results in widening of the bond length between manganese and oxygen and in loosening of the crystal structure of manganese dioxide. Consequently, the manganese dioxide has poor reversibility and charge and discharge characteristics.

This applies also to $\beta$-MnO$_2$ heat-treated at temperatures of 350°–430° C. as disclosed in U.S. Pat. No. 4,133,856.

The active material for the positive electrode may comprise $\delta$-manganese dioxide having a laminar structure or $\alpha$-manganese dioxide having a structure including larger channels than $\gamma$-$\beta$ and $\beta$-manganese dioxides. This is considered to improve the reversibility of the non-aqueous secondary cell since the spaces are then increased for doping and undoping lithium ions.

$\delta$- and $\alpha$- manganese oxides contain potassium ions and ammonium ions in their structure. These ions elude into the electrolyte during the charging and discharging, thereby to greatly deteriorate the charge and discharge characteristics.

SUMMARY OF THE INVENTION

The object of the present invention is to improve charge and discharge cycle characteristics of the non-aqueous secondary cell comprising a positive electrode having manganese oxide as the active material.

The above object is achieved, according to the present invention, by a repeatedly chargable and dischargable non-aqueous secondary cell comprising a negative electrode having lithium or a lithium alloy as an active material, a positive electrode having as an active material a manganese oxide expressed by a chemical formula Li$_{1-x}$Mn$_2$O$_4$ wherein $1 \geqq X \geqq 0$, a separator disposed between the positive electrode and the negative electrode, and a non-aqueous electrolyte.

An improvement in the charge and discharge cycle characteristics may also be effected where the manganese oxide is a spinel type manganese oxide expressed by the chemical formula Li$_{1-x}$Mn$_2$O$_4$ wherein $X=0$.

The manganese oxide may comprise $\lambda$-manganese oxide expressed by the chemical formula Li$_{1-x}$Mn$_2$O$_4$ wherein $X=1$.

Further, the manganese oxide may have a crystal structure intermediate between a spinel type manganese oxide and $\lambda$-manganese oxide, which is a lithium-containing manganese oxide expressed by the chemical formula Li$_{1-x}$Mn$_2$O$_4$ wherein $1 > X > 0$.

The spinel type manganese oxide noted above is prepared by mixing Mn$_2$O$_3$ and Li$_2$CO$_3$ and thereafter heat-treating a resulting mixture in the air.

$\lambda$-manganese oxide is prepared by immersing a spinel type manganese oxide in acid.

The manganese oxide having a crystal structure intermediate between a spinel type manganese oxide and $\lambda$-manganese oxide may be prepared by one of the following processes: immersing the spinel type manganese oxide in acid; immersing $\delta$-MnO$_2$ or $\alpha$-MnO$_2$ in LiOH solution, thereafter applying a microwave thereto until the LiOH solution evaporates, and heat-treating; and substituting lithium ions for dissimilar cations contained in a crystal structure of $\delta$-MnO$_2$ or $\alpha$-MnO$_2$ and thereafter heat-treating the manganese dioxide.

As noted above, the present invention employs, as the active material for the positive electrode, the spinel type or $\lambda$-manganese oxide which has a three-dimensional channel structure and whose crystal structure is not easily collapsible and does not contain potassium ions or the like, or the manganese oxide having a crystal structure intermediate between these two types of manganese oxides. Through such measure the present invention provides a great improvement in the cycle characteristics of this type of cell, and the improvement is believed to have immense utility in industry.

BRIEF DESCRIPTION OF THE DRAWINGS

The above and other objects, advantages and features of the invention will become apparent from the following description thereof taken in conjunction with the accompanying drawings, in which:—

FIGS. 1a–1e are views showing X-ray diffraction patterns where charges and discharges are repeated on a cell having a positive electrode formed of $\gamma$-$\beta$MnO$_2$, wherein FIG. 1a shows a diffraction pattern prior to charging and discharging, FIGS. 1b and 1c show diffraction patterns at a 10th discharge and a subsequent charge, respectively, and FIGS. 1d and 1e show diffraction patterns at a 100th discharge and a subsequent charge, respectively, FIG. 2 is a half section of a cell according to the present invention, FIGS. 8a–8g are views showing X-ray diffraction patterns where charges and discharges are repeated on a cell according to the present invention employing a spinel type manganese oxide as the active material for the positive electrode, wherein FIG. 8a shows a diffraction pattern prior to charging and discharging, FIGS. 8b and 8c show diffraction patterns at a 10th discharge and a subsequent charge, respectively, FIGS. 8d and 8e show diffraction patterns at a 100th discharge and a subsequent charge, respectively, and FIGS. 8f and 8g show diffraction patterns at a 150th discharge and a subsequent charge, respectively.

DETAILED DESCRIPTION OF THE INVENTION

Example 1

Figure 1A:
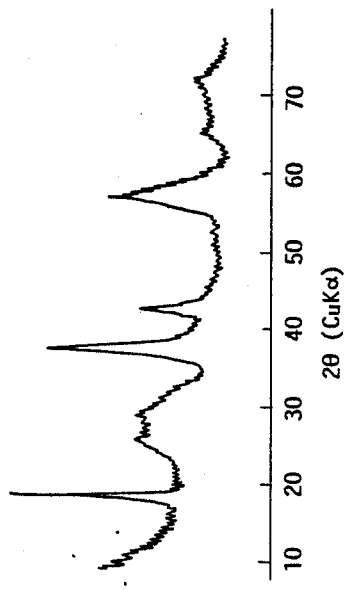
Figure 1C:
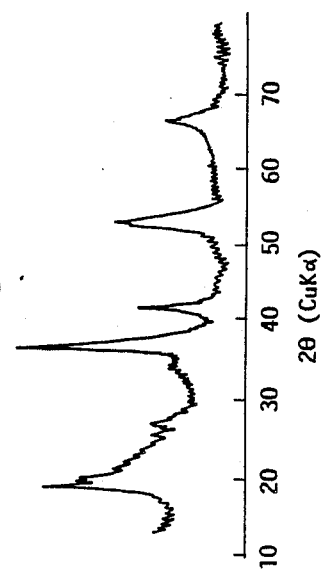
Figure 1B:
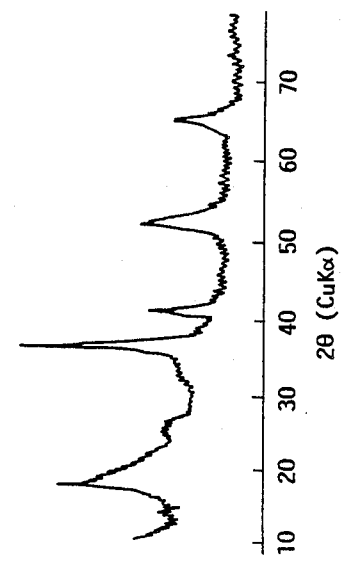

A first example embodying the present invention will be described hereinafter with reference to a flat type non-aqueous secondary cell as shown in FIG. 2.

The illustrated cell comprises positive and negative terminal cans 1 and 2 formed of stainless steel and separated from each other by an insulating packing 3 formed of polypropylene. Number 4 indicates a positive electrode constituting the gist of this invention, which is pressed upon a positive collector 5 secured to a bottom inside surface of the positive terminal can 1. Number 6 indicates a negative electrode pressed upon a negative collector 7 secured to a bottom inside surface of the negative terminal can 2. Number 8 indicates a separator comprising a porous membrane of polypropylene. This cell employs an electrolyte comprising lithium perchlorate dissolved in 1 M in an equal volume solvent mixture of propylene carbonate and dimethoxyethane.

Figure 3:
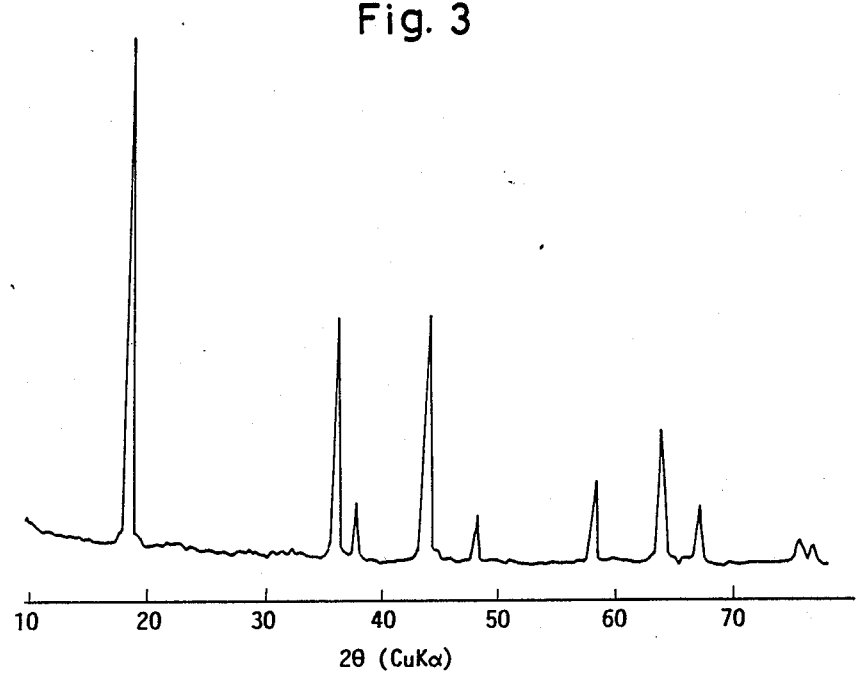
FIGS. 3 through 6 are views showing X-ray diffraction patterns of various types of manganese oxide used as the active material for the positive electrode of the cell according to the present invention.

The positive and negative electrodes are prepared as follows:

100 grams of $Mn_2O_3$ and 23.4 grams of $Li_2CO_3$ are first mixed in a Mn-Li molar ratio of 2:1, and then heat-treated in the air at 650° C. for six hours and at 850° C. for fourteen hours. This heat treatment produces a spinel type manganese oxide (which is expressed by a chemical formula $Li_{1-x}Mn_2O_4$ wherein $X=0$). FIG. 3 shows an X-ray diffraction pattern of this sample. This X-ray diffraction pattern agrees with the $LiMn_2O_4$ data on ASTM Card No. 35-782, which confirms that the product resulting from the above process is a spinel type manganese oxide. The above heat treatment should preferably be carried out in an oxidizing atmosphere.

Next, 90% by weight of this spinel type manganese oxide is mixed with 6% by weight of acetylene black acting as conductive agent and 4% by weight of fluoric resin powder acting as binder to produce a blend for forming the positive electrode. This blend is molded under a pressure of 5 tons/cm² into a shape having a 20 mm diameter, and then heat-treated in a vacuum at 200° to 300° C., whereby the positive electrode is completed. This positive electrode has a theoretical capacity of 50 mAH.

The negative electrode, on the other hand, is prepared by punching a piece 20 mm in diameter out of a lithium foil having a selected thickness. This negative electrode has a theoretical capacity of 200 mAH.

A cell 24.0 mm in diameter and 3.0 mm in height was formed by using the positive and negative electrodes as prepared above, together with a separator, an electrolyte, etc. This cell embodying the present invention is hereinafter referred to as Cell A1.

Example 2

30 grams of the spinel type manganese oxide prepared through the process in EXAMPLE 1 was immersed in 4N sulfuric acid for 170 hours, and was thereafter rinsed in 2l of pure water, whereby λ-manganese oxide (which is expressed by the chemical formula $Li_{1-x}Mn_2O_4$ wherein $X=1$) was prepared. A cell was formed as in EXAMPLE 1 except that the λ-manganese oxide was used as the active material for the positive electrode. This cell embodying the present invention is hereinafter referred to as Cell A2.

It was confirmed through an atomic absorption analysis that the above acid treatment had completely removed the lithium contained in the spinel type manganese oxide.

Figure 4:
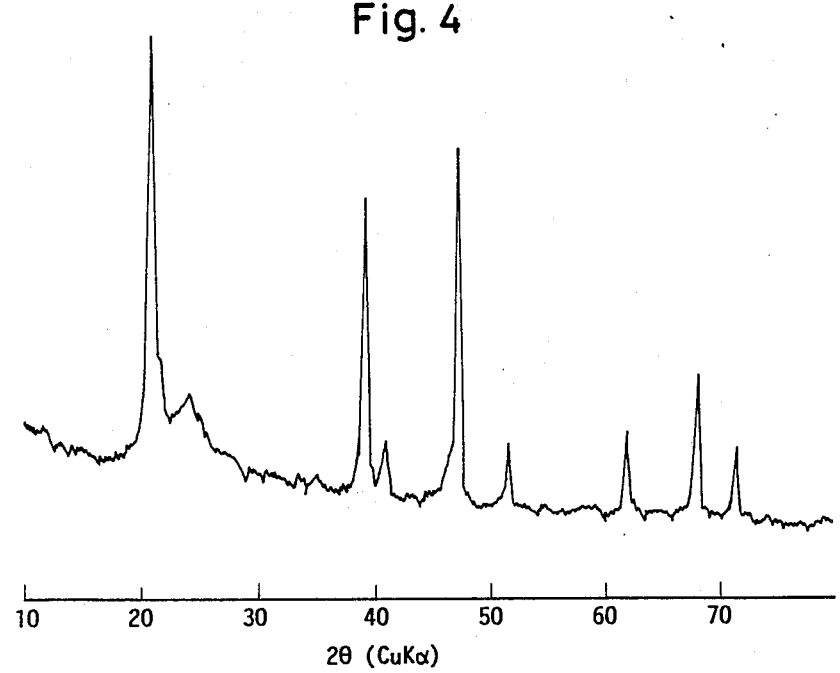

FIG. 4 shows an X-ray diffraction pattern of the above λ-manganese oxide. This diffraction pattern is substantially the same as the diffraction pattern of the spinel type manganese oxide shown in FIG. 3. The diffraction pattern of FIG. 4 differs from that of FIG. 3 only in that a contraction of the lattice caused the peaks to shift in the direction of higher angles compared with the case of the spinel type manganese oxide. This indicates that the λ-manganese oxide retains the coordination between Mn and O continuing from the spinel type.

Example 3

The spinel type manganese oxide prepared through the process in EXAMPLE 1 was immersed in 0.5N sulfuric acid for 100 hours, whereby a manganese oxide having a crystal structure intermediate between the spinel type and λ-manganese oxide (which is expressed by the chemical formula $Li_{1-x}Mn_2O_4$ wherein $X=0.5$) was prepared. A cell was formed as in EXAMPLE 1 except that this manganese oxide having a crystal structure of the intermediate nature was used as the active material for the positive electrode. This cell embodying the present invention is hereinafter referred to as Cell A3.

It was confirmed through the atomic absorption analysis that the above acid treatment had removed about half of the lithium contained in the spinel type manganese oxide.

Figure 5:
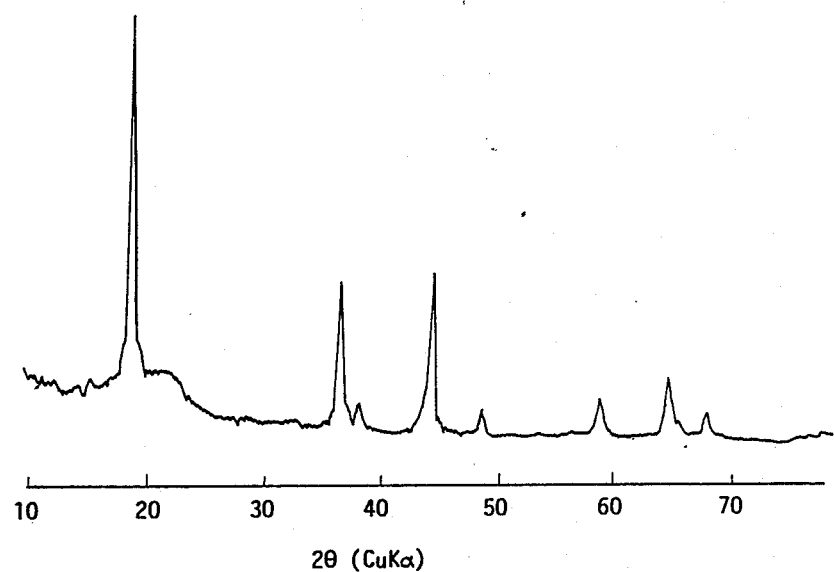

FIG. 5 shows an X-ray diffraction pattern of the manganese oxide having the intermediate crystal structure. This diffraction pattern is substantially the same as the diffraction pattern of the spinel type manganese oxide shown in FIG. 3. The diffraction pattern of FIG. 5 differs from that of FIG. 3 only in that a slight contraction of the lattice caused the peaks to shift to positions between those of the spinel type manganese oxide and λ-manganese oxide. This indicates that the manganese oxide having the crystal structure intermediate between the spinel type and λ-manganese oxide also retains the coordination between Mn and O continuing from the spinel type.

Example 4

δ-manganese oxide prepared by adding 1.5 l of 2 N hydrochloric acid to 500 ml of 1 M potassium permanganate solution was immersed in 1 M LiOH solution. Thereafter the product was exposed to a microwave of about 2.45 GHz frequency until the LiOH solution evaporated. After repeating this process several times, the product was rinsed in pure water and then heat-treated in the air at temperatures of 200°–450° C. for 20 hours, whereby a manganese oxide having a crystal structure intermediate between the spinel type and λ-manganese oxide (which is expressed by the chemical formula $Li_{1-x}Mn_2O_4$ wherein $1>X>0$) was prepared. A cell was formed as in EXAMPLE 1 except that this manganese oxide having a crystal structure of the intermediate nature was used as the active material for the positive electrode. This cell embodying the present invention is hereinafter referred to as Cell A4.

Figure 6:
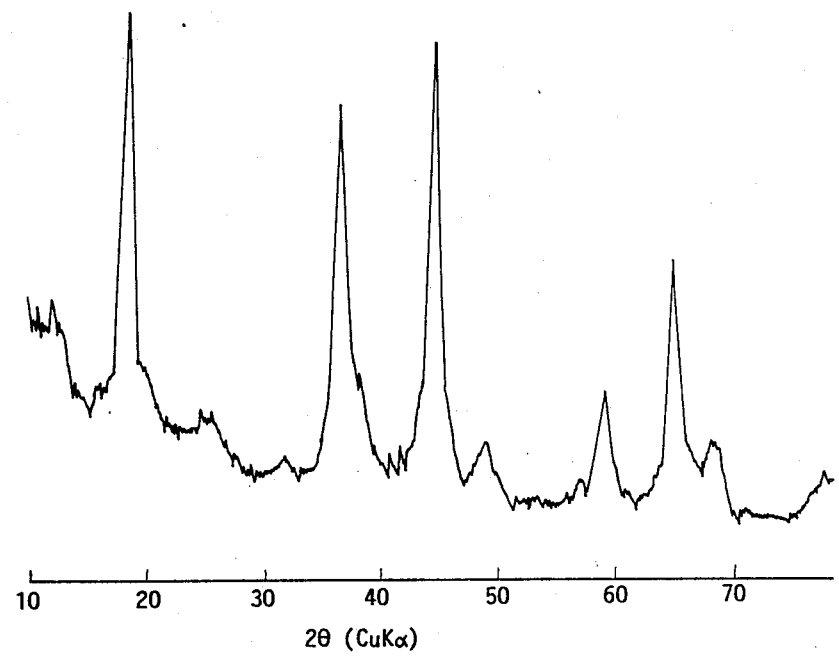

FIG. 6 shows an X-ray diffraction pattern of this manganese oxide having the intermediate crystal structure. This diffraction pattern is substantially the same as the diffraction pattern of the spinel type manganese oxide shown in FIG. 3. The diffraction pattern of FIG. 6 differs from that of FIG. 3 only in that, as in EXAMPLE 3, a slight contraction of the lattice caused the peaks to shift to positions between those of the spinel type manganese oxide and λ-manganese oxide. This indicates that lithium is doped in the manganese oxide.

Comparative example 1

γ-β manganese dioxide was prepared by heat treating I.C. No. 12 chemical manganese dioxide in the air at a temperature of 200°–400° C. And a cell was formed as in EXAMPLE 1 except that this manganese dioxide was used as the active material for the positive electrode. This cell is hereinafter referred to as Comparative Cell B1.

Comparative example 2

δ-manganese dioxide was heat-treated in the air at a temperature of 200°–400° C. for 20 hours without doping lithium. And a cell was formed as in EXAMPLE 1 except that this δ-manganese dioxide was used as the active material for the positive electrode. This cell is hereinafter referred to as Comparative Cell B2.

Comparative example 3

α-manganese dioxide obtained by adding potassium permangate and potassium nitrate to a manganese sulfate solution was heat-treated in the air at a temperature of 200°–400° C. without doping lithium. And a cell was formed as in EXAMPLE 1 except that this α-manganese dioxide was used as the active material for the positive electrode. This cell is hereinafter referred to as Comparative Cell B3.

Figure 7:
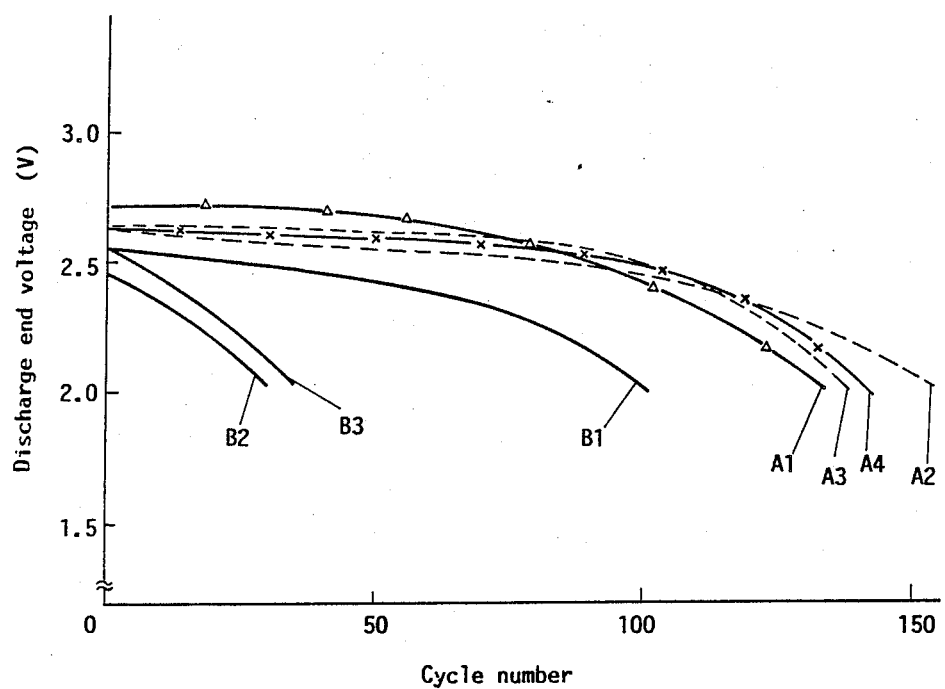
FIG. 7 is a view showing cycle characteristics of cells.

Cycle characteristics of Cells A1–A4 according to the present invention and Comparative Cells B1–B3 were checked and the results are shown in FIG. 7. The testing conditions were such that the discharge was carried out in a current of 3 mA for four hours, the charge in the current of 3 mA, and the charge ending voltage was 4.0 V.

It will be seen from FIG. 7 that discharge ending voltages of Cells A1–A4 according to the present invention drop to 2.0 V only after 130–150 cycles of charge and discharge whereas Comparative Cell B1 has the discharge ending voltage dropping to 2.0 V around the 100th cycle and Comparative Cells B2 and B3 have the discharge ending voltages dropping to 2.0 V around the 30th cycle. This indicates that Cells A1–A4 according to the present invention are far superior in cycle characteristics to Comparative Cells B1–B3.

The reason for the improvement in the cycle characteristics will be explained with reference to FIGS. 8a–8g.

Figure 8A:
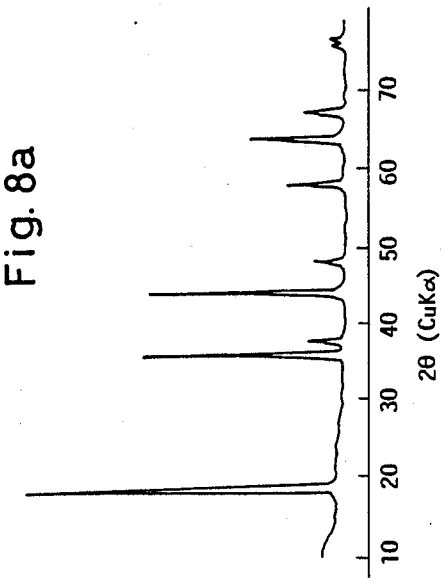
Figure 8C:
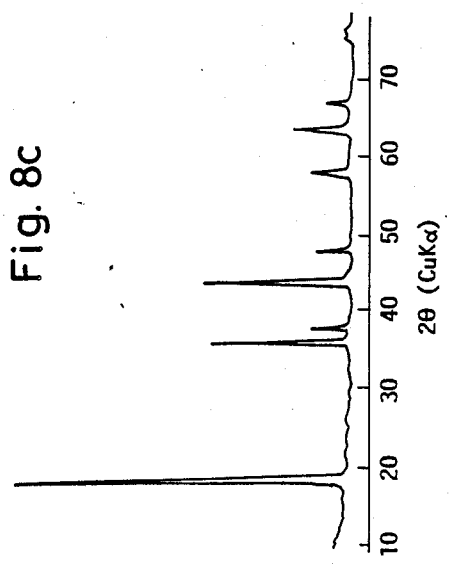
Figure 8B:
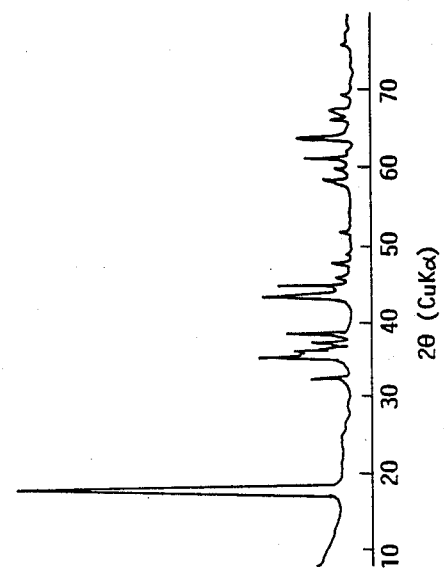
Figure 8E:
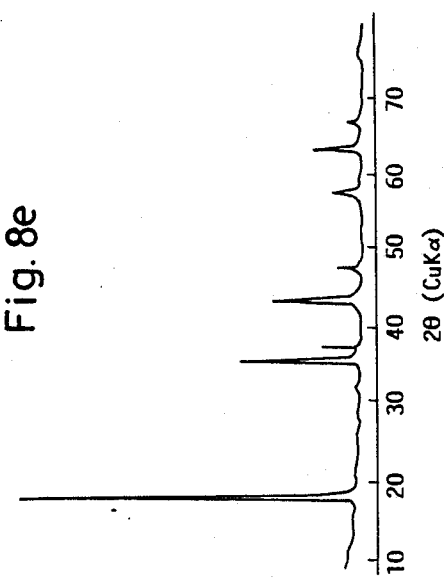
Figure 8G:
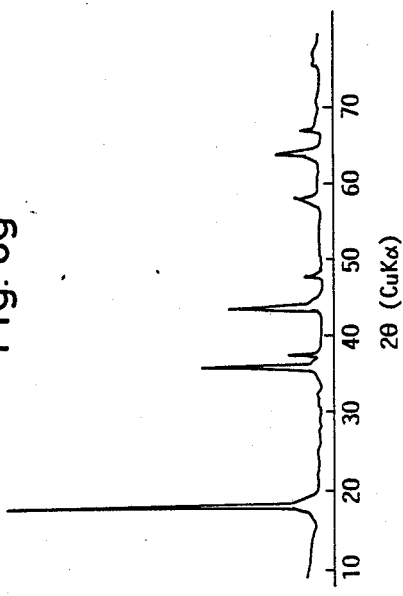
Figure 8D:
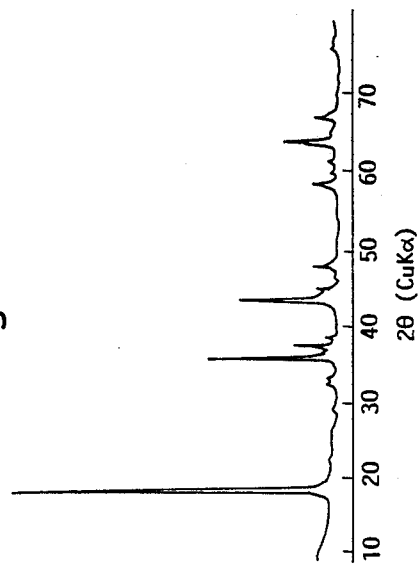
Figure 8F:
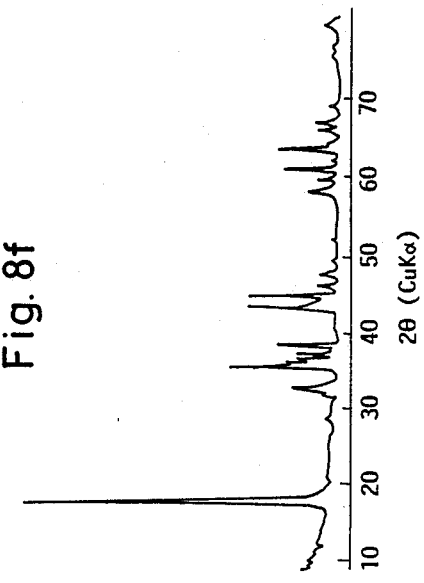

Compared with the a diffraction pattern prior to charging and discharging shown in FIG. 8a, diffraction patterns at a 10th charge shown in FIGS. 8b and 8c indicate no weakening of the peaks and no shift of diffraction angles. This is true also of diffraction patterns at a 100th charge shown in FIGS. 8d and 8e and diffraction patterns at a 150th charge shown in FIGS. 8f and 8g. This demonstrates that, were the spinel type or λ-manganese oxide or a manganese oxide having a crystal structure of the intermediate nature is used as the active material for the positive electrode of a non-aqueous secondary cell, there occurs no collapse of the crystal structure with the charge and discharge cycles as encountered where γ-β or β-manganese dioxide is used as the active material for the positive electrode. Thus, the cells according to the present invention have improved reversibility and charge and discharge characteristics. It is considered that, while γ-β and β-manganese dioxides have a one-dimensional channel structure, the spinel type and λ-manganese oxides and the manganese oxide having a crystal structure of the intermediate nature have a three-dimensional channel structure which facilitates smooth doping and undoping of lithium ions at times of charging and discharging. Besides, unlike δ- and α-manganese dioxides, the spinel type and λ-manganese oxides and the manganese oxide having an intermediate crystal structure do not contain potassium ions or ammonium ions in their crystal structure, thereby to prevent deterioration of the charge and discharge characteristics.

In EXAMPLE 3 the spinel type manganese oxide was immersed in 0.5N sulfuric acid for 100 hours, to prepare the manganese oxide having a crystal structure intermediate between the spinel type and λ-manganese oxide (which is expressed by the chemical formula $Li_{1-x}Mn_2O_4$ wherein $X=0.5$). By varying this acid treatment conditions, it is possible to prepare manganese oxides of the intermediate crystal structure containing lithium in various degrees of concentration (i.e. lithium-containing manganese oxides expressed by the chemical formula $Li_{1-x}Mn_2O_4$ wherein $1>X>0$).

Further, the manganese oxide having the intermediate crystal structure may be prepared by other methods, for example, by a method in which lithium ions are substituted for dissimilar cations contained in the crystal structure of $\delta$-$MnO_2$ or $\alpha$-$MnO_2$ which is followed by a heat treatment.

In the foregoing embodiments, lithium is used as the active material for the negative electrode. However, a lithium alloy may be employed instead of lithium. Such lithium alloys include lithium-aluminum alloy, lithium-magnesium alloy and the like.

In addition, the present invention is not limited to the secondary cell using the non-aqueous electrolyte. It will be apparent that the invention is applicable to a non-aqueous secondary cell using a solid electrolyte as well.

What is claimed is:

1. A repeatedly chargeable and dischargeable nonaqueous secondary cell comprising:
   a negative electrode having lithium or a lithium alloy as an active material, a positive electrode having manganese oxide of the formula $Li_{1-x}Mn_2O_4$, wherein $1 > X > 0$, as an active material when said cell is prepared, a separator disposed between said positive electrode and said negative electrode, and a non-aqueous electrolyte.

2. A cell as claimed is claim 1 wherein said manganese oxide is a manganese oxide having a crystal structure intermediate between a spinel type manganese oxide and λ-manganese oxide.

3. A cell as claimed in claim 2 wherein said manganese oxide having a crystal structure intermediate between a spinel type manganese oxide and λ-manganese oxide is prepared by immersing said spinel type manganese oxide in acid.

4. A cell as claimed in claim 3 wherein a lithium concentration in the manganese oxide is varied by changing acid treatment conditions.

5. A cell as claimed in claim 2 wherein said manganese oxide having a crystal structure intermediate between a spinel type manganese oxide and λ-manganese oxide is prepared by immersing λ-$MnO_2$ or α-$MnO_2$ in LiOH solution, thereafter applying a microwave thereto until said LiOH solution evaporates, and heat-treating.

6. A cell as claimed in claim 2 wherein said manganese oxide having a crystal structure intermediate between a spinel type manganese oxide and λ-manganese oxide is prepared by substituting lithium ions for dissimilar cations contained in a crystal structure of δ-$MnO_2$ or α-$MnO_2$ and thereafter heat-treating the manganese dioxide.

7. A cell as claimed in claim 1 wherein said negative electrode is formed of a material selected from the group consisting of pure lithium, lithium-aluminum alloy and lithium-magnesium alloy.

8. A cell as claimed in claim 1 wherein said separator comprises a porous membrane of polypropylene.

9. A cell as claimed in claim 1 wherein said electrolyte comprises a liquid mixture formed by dissolving lithium perchlorate in a solvent mixture of propylene carbonate and dimethoxyethane.

10. A cell as claimed in claim 1 wherein said positive electrode is pressed upon a positive collector secured to a bottom inside surface of a positive terminal can.

11. A cell as claimed in claim 1 wherein said negative electrode is pressed upon a negative collector secured to a bottom inside surface of a negative terminal can.

* * * * *